(12) United States Patent
Hirabayashi et al.

(10) Patent No.: US 6,641,073 B2
(45) Date of Patent: Nov. 4, 2003

(54) REEL MOUNT

(76) Inventors: Koichiro Hirabayashi, 9-5, Yamanoue 1-chome, Hirakata-shi, Osaka 573-0047 (JP); Kazuo Shibukawa, 5-6-307, Wakasonocho, Ibaraki-shi, Osaka 567-0894 (JP)

( * ) Notice: Subject to any disclaimer, the term of this patent is extended or adjusted under 35 U.S.C. 154(b) by 3 days.

(21) Appl. No.: 10/152,320

(22) Filed: May 20, 2002

(65) Prior Publication Data

US 2002/0175241 A1 Nov. 28, 2002

(30) Foreign Application Priority Data

May 25, 2001 (JP) .......................................... 2001-156554

(51) Int. Cl.[7] .............................................. G11B 15/32
(52) U.S. Cl. ...................................... 242/349; 360/96.3
(58) Field of Search .......................... 242/349; 360/96.3

(56) References Cited

U.S. PATENT DOCUMENTS 6,092,755 A * 7/2000 Konishi et al. ........ 360/96.3 X

* cited by examiner

Primary Examiner—John Q. Nguyen

(57) ABSTRACT

A reel mount for taking up/feeding a magnetic tape to/from a reel by rotating the reel includes: a first reel mount member having a portion engaged with the reel; a yoke board for providing a magnetic loop, the yoke board integrally formed with the first reel mount member and made of a ferromagnet; a magnet provided on the yoke board so as to be in contact therewith; a hysteresis board provided so as to be opposed to the magnet with respect to the magnet, the hysteresis board made of a material having large magnetic hysteresis loss; and a second reel mount member integrally formed with the hysteresis board, wherein the reel is in direct contact with the yoke board when the reel is mounted on the reel mount.

6 Claims, 2 Drawing Sheets

REEL MOUNT

BACKGROUND OF THE INVENTION

1. Field of the Invention

The present invention relates to a reel mount of a magnetic recording/reproducing apparatus which stably maintains tension on a magnetic tape wound around a reel which is placed on the reel mount when taking up/feeding the magnetic tape in/from a cassette.

2. Description of the Related Art

Recently, among magnetic recording/reproducing apparatuses, videotape camera-recorders are becoming more compact and less expensive.

Referring to FIGS. 3 and 4, a structure of a conventional reel mount of a conventional magnetic recording/reproducing apparatus will be described below.

FIG. 3 is a top view of a conventional reel mount. FIG. 4 is a cross-sectional view of the conventional reel mount taken along line B—B shown in FIG. 3.

In FIG. 4, reference numeral 1a denotes a reel in a cassette. A (magnetic) tape (not shown) is wound around the reel 1a. Reference numeral 1b denotes a body of the cassette, reference numeral 2 denotes a chassis of a conventional magnetic recording/reproducing apparatus, and reference numeral 3 denotes a rotation shaft provided in the chassis 2. The conventional reel mount is placed on the rotation shaft 3 so as to be rotatable with respect to an axis of the rotation shaft 3 (shown as a broken line in FIG. 4). Reference numeral 303 denotes an upper reel mount member on which the reel 1a is mounted, reference numeral 305 denotes a rotation engagement member which is movable up and down (i.e., in a direction parallel to the axis of the rotation shaft 3) and is engaged with the upper reel mount member 303 and the reel 1a along a rotation direction of the reel mount, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307 is integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke board 307 is rotatable with respect to the rotation shaft 3. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower reel mount member integrally formed with a hysteresis board 311 having a disk-like shape. The hysteresis board 311 is made of a material having large magnetic hysteresis loss. It is common practice in the field of magnetic recording/reproducing apparatuses to integrally form a hysteresis board member, such as the hysteresis board 311, with a lower reel mount member, such as the lower reel mount member 310, by outsert molding. Similar to the upper reel mount member 303, the lower reel mount member 310 integrally formed with the hysteresis board 311 is placed on the rotation shaft 3 so as to be rotatable with respect to the rotation shaft 3. The lower reel mount member 310 is attracted by the magnetic force of the magnet 308 so as to be in contact with the upper reel mount member 303.

Reference numeral 309 denotes a washer sandwiched between the lower real mount member 310 integrally formed with the hysteresis board 311 and the upper reel mount member 303. The washer 309 is engaged with the lower reel mount member 310 so as to be rotated therewith. Reference numeral 302 denotes a gear member provided to the outer circumference of the lower reel mount member 310, which is engaged with an external gear (not shown). Reference numeral 306 denotes a reel bearing member provided on the upper reel mount member 303 and integrally formed with the yoke board 307 so as to come into contact with the reel 1a when the reel 1a is mounted on the conventional reel mount. Similar to other reel mount members, it is common practice in the field of magnetic recording/reproducing apparatuses to integrally form a reel bearing member, such as the reel bearing member 306, with a yoke board member, such as the yoke board 307. by outsert molding.

When the reel 1a is mounted on the conventional reel mount, a position in a vertical direction of the reel 1a with respect to the chassis 2 is defined by the reel bearing member 306. Reference numeral 4 denotes a washer placed between the reel mount and the base of the rotation shaft 3 and reference numeral 5 denotes a washer placed on the rotation shaft 3 so as to define movement of the reel mount along a thrust (vertical) direction of the reel mount and to provide a space between the rotation shaft 3 and the upper reel mount member 303.

Operation of the conventional reel mount is described below.

When the lower reel mount member 310 is rotated by the external gear (not shown) through engagement with the gear member 302, friction torque is generated between the upper and lower reel mount members 303 and 310 via the washer 309 due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a. The amount of clutch torque generated by the conventional reel mount is determined by the magnetic attraction and force generated by the magnet 308 and the position in the vertical direction of the reel 1a with respect to the chassis 2 is determined by the reel bearing member 306.

However, in the conventional reel mount, space K shown in FIG. 4 is provided between the reel 1a and the yoke board 307 due to the presence of the reel bearing member 306, thereby limiting a size of the magnet 308. When the size of the magnet 308 is reduced, it is not possible to realize a reel mount which provides sufficient clutch torque, since a smaller magnet generates smaller magnetic attraction and force. Thus, the space K (i.e., the presence of the reel bearing member 306) prevents a compact reel mount which provides sufficient clutch torque from being realized. Furthermore, when using an inexpensive magnetic material, such as ferrite, for the magnet 308, such a magnetic material provides lower magnetic force as compared to an expensive magnetic material having high magnetic force, such as samarium cobalt. Thus, compared to a magnet of samarium cobalt, the volume of the magnet having a lower magnetic force is required to be greater so as to provide sufficient magnetic force such that the reel mount can have sufficient clutch torque. Therefore, the space K (i.e., the presence of the reel bearing member 306) also prevents a reduction in production cost of the conventional reel mount.

Further still, in the conventional reel mount, the position in the vertical direction of the conventional reel mount with respect to the chassis 2 is important for enabling a tape wound around the reel 1a to stably traverse the reel in a cassette, and this position is accurately defined by a height of the reel bearing member 306. However, it is difficult to provide the reel bearing member 306 having a suitable height with high precision since deformation of the yoke board 307 and/or the reel bearing member 306, sink marks in surfaces of the reel bearing member 306, etc., are caused due to the molding conditions during outsert molding of the integral reel bearing member 306 and the yoke board 307 or post-mold shrinkage of the reel bearing member 306.

The present invention provides solutions to the above-described problems of the conventional reel mount as described below.

SUMMARY OF THE INVENTION

According to one aspect of the present invention, there is provided a reel mount for taking up/feeding a magnetic tape to/from a reel by rotating the reel, which includes: a first reel mount member having a portion engaged with the reel; a yoke board for providing a magnetic loop, the yoke board integrally formed with the first reel mount member and made of a ferromagnet; a magnet provided on the yoke board so as to be in contact therewith; a hysteresis board provided so as to be opposed to the yoke board with respect to the magnet, the hysteresis board made of a material having large magnetic hysteresis loss; and a second reel mount member integrally formed with the hysteresis board, the reel being in direct contact with the yoke board when the reel is mounted on the reel mount.

In one embodiment of this invention, the magnet substantially fills a space between the first and second reel mount members.

In one embodiment of this invention, the yoke board defines amounted position of the reel when the reel is mounted on the reel mount.

In one embodiment of this invention, the yoke board is integrally formed with the first reel mount member by outsert molding.

In one embodiment of this invention, the hysteresis board is integrally formed with the second reel mount member by outsert molding.

In one embodiment of this invention, the reel mount is provided on a rotation shaft in a chassis of a magnetic recording/reproducing apparatus for recording/reproducing information to/from the magnetic tape, the first and second reel mount members being rotatable with respect to the rotation shaft.

Thus, the invention described herein makes possible the advantages of providing a compact and inexpensive reel mount used for a magnetic recording/reproducing apparatus which provides sufficiently high clutch torque and has a suitable height defined with high precision for reliably taking-up/feeding a magnetic tape to/from a reel.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to FIGS. 1 and 2.

Example 1

Figure 1:
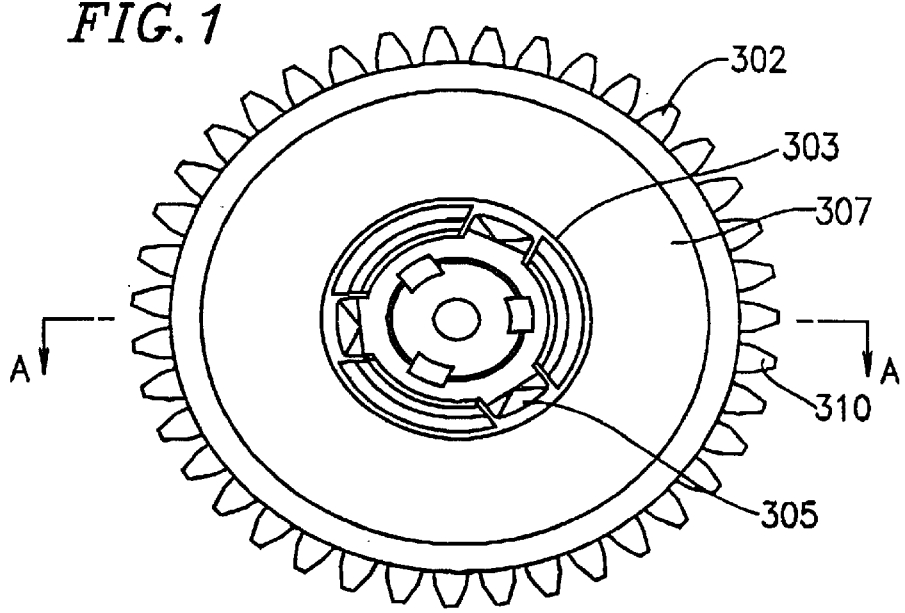
FIG. 1 is a top view of a reel mount according to Example 1 of the present invention.
Figure 3:
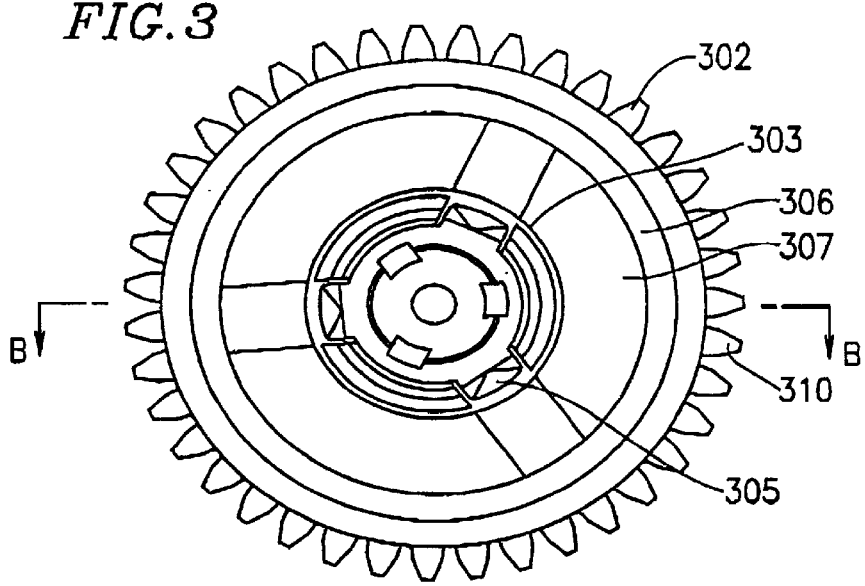
FIG. 3 is a top view of a conventional reel mount.
Figure 4:
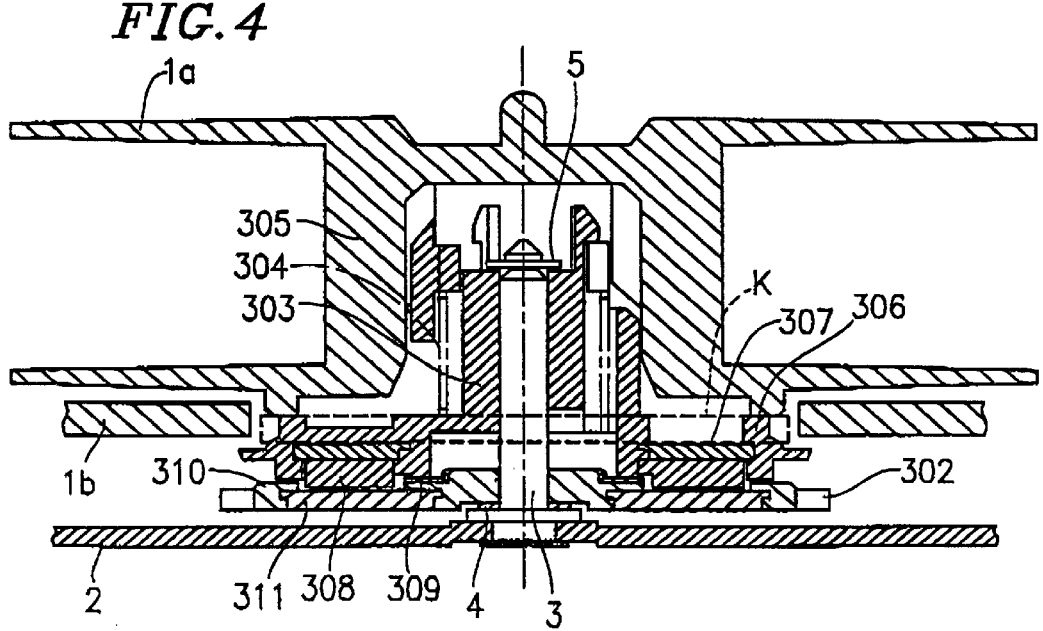
FIG. 4 is a cross-sectional view of the conventional reel mount taken along line B—B shown in FIG. 3.

FIG. 1 is a top view of a reel mount according to Example 1 of the present invention. FIG. 2 is a cross sectional view of the reel mount according to Example 1 of the present invention taken along line A—A shown in FIG. 1. In FIGS. 1 and 2, components having the same functions and names as those shown in FIGS. 3 and 4 are denoted by the same reference numerals.

Figure 2:
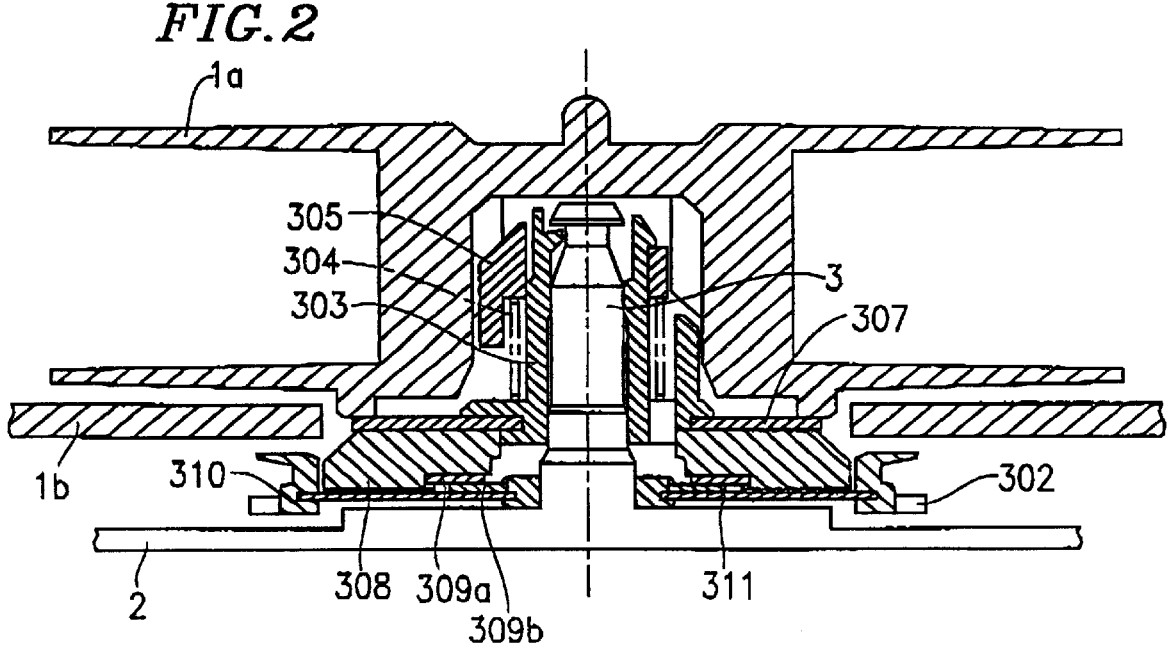
FIG. 2 is a cross sectional view of the reel mount according to Example 1 of the present invention taken along line A—A shown in FIG. 1.

In FIG. 2, reference numeral 1a denotes a reel in a cassette. A (magnetic) tape (not shown) is wound around the reel 1a, Reference numeral 1b denotes a body of the cassette, reference numeral 2 denotes a chassis of a magnetic recording/reproducing apparatus used for recording/reproducing information to/from the magnetic tape of the cassette, and reference numeral 3 denotes a rotation shaft provided in the chassis 2. For example, the rotation shaft 3 can be integrally formed with the chassis as shown in FIG. 2. The reel mount according to Example 1 of the present invention is placed on the rotation shaft 3 so as to be rotatable with respect to an axis of the rotation shaft 3 (shown as a broken line in FIG. 2) Reference numeral 303 denotes an upper (first) reel mount member on which the reel 1a is mounted, reference numeral 305 denotes a rotation engagement member which is movable up and down (i.e., in a direction parallel to the axis of the rotation shaft 3) and is engaged with the upper reel mount member 303 and the reel 1a along a rotation direction of the reel mount 1, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307 is integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke board 307 is rotatable with respect to the rotation shaft 3. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower (second) reel mount member integrally formed with a hysteresis board 311 having a disk-like shape. The hysteresis board 311 is made of a material having large magnetic hysteresis loss. It is common practice in the field of magnetic recording/reproducing apparatuses to integrally form a hysteresis board, such as the hysteresis board 311, with a lower reel mount member, such as the lower reel mount member 310, by outsert molding. Similar to the upper reel mount member 303, the lower reel mount member 310 integrally formed with the hysteresis board 311 is placed on the rotation shaft 3 so as to be rotatable with respect to the rotation shaft 3. The hysteresis board 311 is attracted by the magnetic force of the magnet 308 so as to be in contact with the magnet 308.

Reference numerals 309a and 309b denote washers sandwiched between the magnet 308 and the hysteresis board 311. The washer 309a is engaged with the magnet 308 so as to be rotated with the upper reel mount member 303. The washer 309b is engaged with the lower reel mount member 310 so as to be rotated therewith. Reference numeral 302 denotes a gear member provided to the outer circumference of the lower reel mount member 310, which is engaged with an external gear (not shown).

Operation of the reel mount according to Example 1 of the present invention is described below.

When the lower reel mount member 310 is rotated by the external gear (not shown) through engagement with the gear member 302, friction torque is generated between the upper and lower reel mount members 303 and 310 via the washers 309a and 309b due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a. The amount of clutch torque generated by the reel mount is determined by the magnetic attraction and force generated by the magnet 308. The reel 1a is in contact with the yoke board 307 and the position of the reel 1a in a vertical direction of the reel 1a with respect to the chassis 2 is determined by the yoke board 307.

As described above, the present invention provides a reel mount used for taking up/feeding a magnetic tape to/from a reel of a cassette by rotating the reel. The reel mount according to the present invention includes: an upper reel mount member having a portion engaged with the reel; a yoke board for providing a magnetic loop, the yoke board integrally formed with the upper reel mount member and made of a ferromagnet; a magnet provided on the yoke board so as to be in contact therewith; a hysteresis board provided so as to be opposed to the yoke board with respect to the magnet, the hysteresis board made of a material having large magnetic hysteresis loss; and a lower reel mount member integrally formed with the hysteresis board, where the reel is in direct contact with the yoke board when the reel is mounted on the reel mount.

According to the reel mount of the present invention, there is no space provided between the reel and the yoke board unlike reel mounts which include a reel bearing member, such that substantially all of the space in the lower part of the reel mount, i.e., the space between the upper and lower reel mount members 303 and 310, is filled with a magnet. Thus, it is possible to provide a magnet having a larger volume in the reel mount of the present invention, thereby realizing a compact and inexpensive reel mount used for a magnetic recording/reproducing apparatus which provides sufficiently high clutch torque for reliably taking-up/feeding a magnetic tape to/from a reel of a cassette.

Further, in the present invention, the position in a vertical direction of the reel (i.e., a mounted position of the reel) with respect to a chassis of a magnetic recording/reproducing apparatus is defined by the yoke board which is in direct contact with the reel, and a reel bearing member which is conventionally provided so as to be integrally formed with the yoke board by outsert molding is not present in the reel mount of the present invention. Thus, it is possible to realize a reel mount which defines a suitable position in a vertical direction of the reel with respect to a chassis of a magnetic recording/reproducing apparatus with high precision without being affected by deformation of the yoke board and/or the reel bearing member, sink marks in surfaces of the reel bearing member, etc., conventionally caused due to the molding conditions during outsert molding of the reel bearing member with the yoke board or post-molding shrinkage of the reel bearing member.

As described above, the present invention achieves an advantageous effect of providing a compact and inexpensive reel mount used for a magnetic recording/reproducing apparatus which provides sufficiently high clutch torque and has a suitable height defined with high precision for reliably taking-up/feeding a magnetic tape to/from a reel of a cassette.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reel mount for taking up/feeding a magnetic tape to/from a reel by rotating the reel, comprising:

a first reel mount member having a portion engaged with the reel;

a yoke board for providing a magnetic loop, the yoke board integrally formed with the first reel mount member and made of a ferromagnet;

a magnet provided on the yoke board so as to be in contact therewith;

a hysteresis board provided so as to be opposed to the yoke board with respect to the magnet, the hysteresis board made of a material having large magnetic hysteresis loss; and a second reel mount member integrally formed with the hysteresis board, wherein the reel is in direct contact with the yoke board when the reel is mounted on the reel mount.

2. A reel mount according to claim 1, wherein the magnet substantially fills a space between the first and second reel mount members.

3. A reel mount according to claim 1, wherein the yoke board defines amounted position of the reel when the reel is mounted on the reel mount.

4. A reel mount according to claim 1, wherein the yoke board is integrally formed with the first reel mount member by outsert molding.

5. A reel mount according to claim 1, wherein the hysteresis board is integrally formed with the second reel mount member by outsert molding.

6. A reel mount according to claim 1, wherein the reel mount is provided on a rotation shaft in a chassis of a magnetic recording/reproducing apparatus for recording/reproducing information to/from the magnetic tape, the first and second reel mount members being rotatable with respect to the rotation shaft.

* * * * *